United States Patent
Nguyen

(10) Patent No.: US 10,237,380 B1
(45) Date of Patent: Mar. 19, 2019

(54) MOVABLE COVER FOR CAMERA OF ELECTRONIC DEVICE

(71) Applicant: Phuong Mai Nguyen, Las Vegas, NV (US)

(72) Inventor: Phuong Mai Nguyen, Las Vegas, NV (US)

( * ) Notice: Subject to any disclaimer, the term of this patent is extended or adjusted under 35 U.S.C. 154(b) by 0 days.

(21) Appl. No.: 16/102,473

(22) Filed: Aug. 13, 2018

Related U.S. Application Data

(60) Provisional application No. 62/707,791, filed on Nov. 17, 2017.

(51) Int. Cl.
  *H04M 1/00* (2006.01)
  *H04M 1/02* (2006.01)
  *H04M 1/18* (2006.01)

(52) U.S. Cl.
  CPC ......... *H04M 1/0264* (2013.01); *H04M 1/185* (2013.01)

(58) Field of Classification Search
  CPC .. H04B 1/3888; H04M 1/185; H04M 1/0264; H04M 1/02; H04M 1/0214; H04M 1/72527; H04M 1/72544; H04M 1/72547; H04M 1/72; H04M 1/725; G06Q 30/00; H04Q 7/22; G07F 17/32; G07F 17/3239
  USPC ........ 455/575.8, 575.1, 412.2, 567; 396/328, 396/187; 378/75
  See application file for complete search history.

(56) References Cited

U.S. PATENT DOCUMENTS

| 8,496,390 | B2 * | 7/2013 | Ohuchi | G03B 11/043 |
| | | | | 359/511 |
| D760,677 | S * | 7/2016 | Tsushima | D14/126 |
| D782,562 | S * | 3/2017 | Gustaveson, II | D16/237 |
| 9,829,770 | B1 * | 11/2017 | Gustaveson, II | G03B 11/048 |
| D806,057 | S * | 12/2017 | Park | D14/217 |
| D807,947 | S * | 1/2018 | Gustaveson, II | D16/237 |
| D808,457 | S * | 1/2018 | Gustaveson, II | D16/237 |
| 2004/0259599 | A1 * | 12/2004 | Okawa | G06Q 30/02 |
| | | | | 455/567 |
| 2014/0045557 | A1 * | 2/2014 | Chung | H04M 1/0249 |
| | | | | 455/575.1 |
| 2015/0222315 | A1 * | 8/2015 | O'Neill | H04B 1/3888 |
| | | | | 455/575.8 |
| 2015/0311941 | A1 * | 10/2015 | Sorrentino | H04M 1/185 |
| | | | | 455/575.8 |

(Continued)

FOREIGN PATENT DOCUMENTS

JP 2009105799 A * 5/2009

*Primary Examiner* — Mahendra Patel
(74) *Attorney, Agent, or Firm* — Weide & Miller, Ltd.

(57) ABSTRACT

A cover device selectively covers a camera of an electronic device. The cover device includes a housing and a camera cover device to selectively cover or uncover the camera. The housing has an opening to receive the electronic device. The camera cover device is positioned on a front wall of the housing, and is configured to be selectively moveable to a closed position in which the camera of the electronic device is covered and an open position in which the camera of the electronic device is not covered when the electronic device is inserted into the opening, the camera cover device including a removeable portion. The removeable portion has a design element visible to a user when the removeable portion is disposed on the camera cover device. A user of the camera cover device can utilize removeable portions with different design elements to present a different look.

19 Claims, 10 Drawing Sheets

(56) References Cited

U.S. PATENT DOCUMENTS

2016/0049979 A1\* 2/2016 Grouwstra ........... H04B 1/3888
455/575.8

\* cited by examiner

MOVABLE COVER FOR CAMERA OF ELECTRONIC DEVICE

PRIORITY CLAIM

This application claims priority to provisional application Ser. No. 62/707,791, filed Nov. 17, 2017. The provisional application is incorporated herein in its entirety.

FIELD OF THE INVENTION

Embodiments of the present invention relate to a movable cover for a camera of an electronic device, such as a cell phone, tablet, laptop computer or other electronic device, where the movable cover has a replaceable design element. In particular, the embodiments relate to such a cover movable between a first position covering the camera and a second position in which the camera is uncovered.

BACKGROUND OF THE INVENTION

Electronic devices such as cellphones, personal electronic devices (PEDs), laptops, tablets, etc., often have cameras. The cameras may be on the front of the device, on the back of the device or both. Similar devices such as desktop computers, display devices and televisions may also have such cameras.

The cameras on such devices have presented some concerns with privacy, in that there is a concern that the camera may be accessed and activated by a person other than the owner of the device without permission or knowledge of the owner. Accordingly, it is known to provide covers for cameras on such electronic devices.

Many users of such electronic devices, particularly cellphones and tablets, use these devices with a protective case. Such protective cases are popular and come in many types, and can be made from either a hard or a soft material. The protective cases typically cover the external edges of the device, and often portions of the back of the device to provide protection to the device when it is dropped, for example. The protective cases may have openings to expose parts of the electronic device, such as openings for a camera, a headphone jack, and for operation buttons, such as volume and other controls.

Many users of such electronic devices also want their device to look fashionable or unique. This has led to the design of covers that provide a fashionable look. Considering the frequent breaches into electronic systems by hackers and others, there is a need for an electronic device protective cover that can selectively provide privacy concerning the camera, while at the same time providing aesthetic features to make the device fashionable, especially if the owner can selectively alter the aesthetic features of the cover to the owner's tastes.

SUMMARY OF THE INVENTION

In preferred embodiments of the invention, a cover device for selectively covering a camera of an electronic device is provided. The cover device includes a housing and a camera cover device to selectively cover or uncover a camera of the electronic device. The housing has an opening to receive an edge portion of the electronic device therein, the opening of the housing defined by a front wall, a back wall positioned opposite the front wall, a first side portion connecting the front wall to the back wall, a second side portion connecting the front wall to the back wall, and a top wall connected to the first and second side portions and to the front and back walls, and a front wall opening positioned to expose the camera of the electronic device when the electronic device is inserted into the opening of the cover device. The camera cover device is positioned on the front wall of the housing, and is configured to be selectively moveable to a closed position in which the camera cover device covers the camera of the electronic device and an open position in which the cover device does not cover the camera of the electronic device when the electronic device is inserted into the opening of the cover device, the camera cover device including a removeable portion. The removeable portion has a front portion with a design element disposed thereon so that the design element is visible to a user when the removeable portion is disposed on the camera cover device, wherein a user of the camera cover device can utilize different removeable portions with different design elements to present a different look to the cover device.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 10:
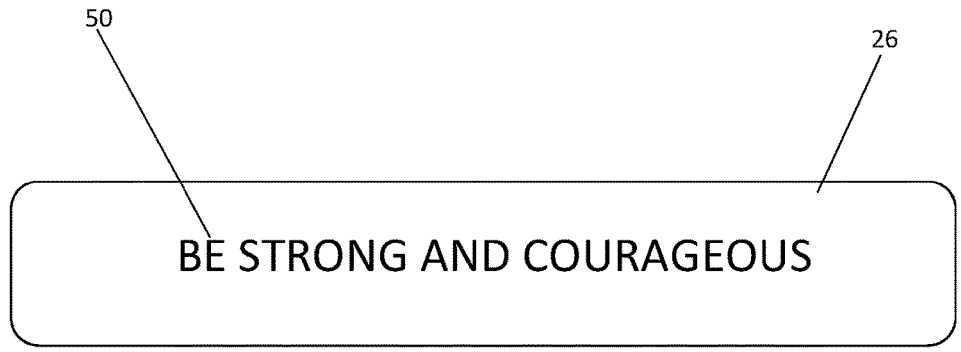
FIG. 10 is a drawing illustrating a removeable portion having a design element in accordance with embodiments of the invention.

The term "design element" is herein defined to mean any text or a graphic design element not present on other portions of the electronic device. For example, the design element may be an inspirational phrase or word(s), such as "BE STRONG AND COURAGEOUS" as illustrated in FIG. 10, a logo or team name, a family name, a school or church name, religious words or phrases, a company or business name, etc.

The embodiments of the present invention provide a cover device for selectively covering a camera of an electronic device. The cover device includes a housing and a camera cover device to selectively cover or uncover a camera of the electronic device. The housing has an opening to receive an edge portion of the electronic device therein, the opening of the housing defined by a front wall, a back wall positioned opposite the front wall, a first side portion connecting the front wall to the back wall, a second side portion connecting the front wall to the back wall, and a top wall connected to the first and second side portions and to the front and back walls, and a front wall opening positioned to expose the camera of the electronic device when the electronic device is inserted into the opening of the cover device. The camera cover device is positioned on the front wall of the housing, and is configured to be selectively moveable to a closed position in which the camera cover device covers the camera of the electronic device and an open position in which the cover device does not cover the camera of the electronic device when the electronic device is inserted into the opening of the cover device, the camera cover device including a removeable portion. The removeable portion has a front portion with a design element disposed thereon so that the design element is visible to a user when the removeable portion is disposed on the camera cover device, wherein a user of the camera cover device can utilize different removeable portions with different design elements to present a different look to the cover device.

As illustrated in FIGS. 1 through 5, embodiments of the invention include a cover device 10 configured to selectively cover a camera of an electronic device when an end portion of the electronic device is inserted into an opening 16 in a bottom of the cover device 10. The cover device is configured to fit snugly over an end portion of the electronic device so that the cover device 10 will stay in place on the electronic device when a user operates or carries the electronic device.

The cover device 10 includes a housing 12, and an opening 16 (see FIG. 5) defined by a front wall 14, a back wall 16, first and second side portions 20 and 22 connecting the front and back walls 14, 16 and a top wall 18. The front wall includes a camera cover device 24.

Figure 1:
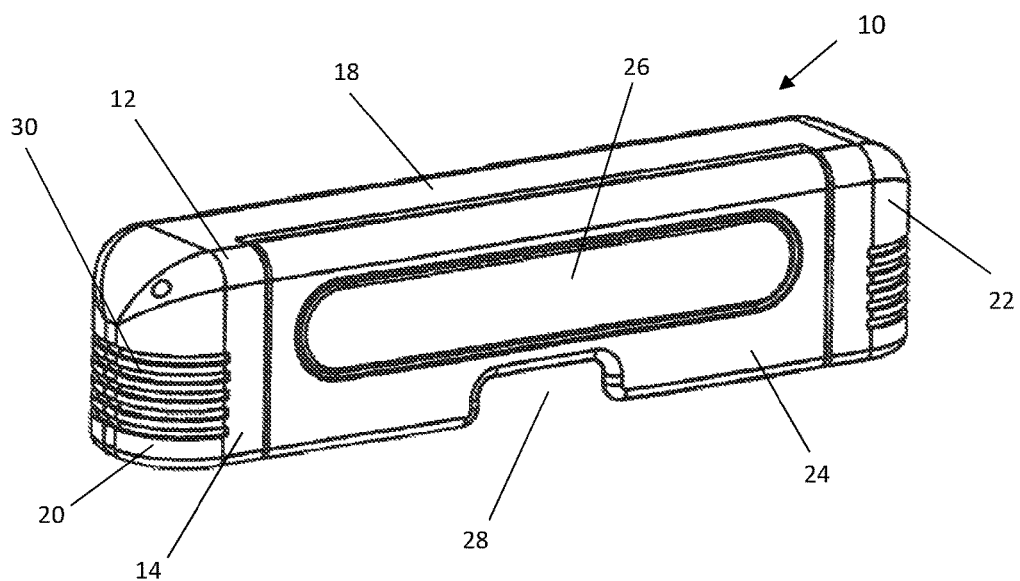
FIG. 1 illustrates a front perspective view of a cover device in accordance with embodiments of the invention.

The camera cover device 24 is configured to selectively cover a camera of the electronic device when the electronic device is inserted into the opening 16. In particular, the camera cover device 24 is configured to be selectively moveable between a closed position in which the camera cover device 24 covers the camera of the electronic device and an open position in which the camera cover device does not cover the camera of the electronic device. FIG. 1 illustrates the camera cover device 24 in the closed position.

Figure 2:
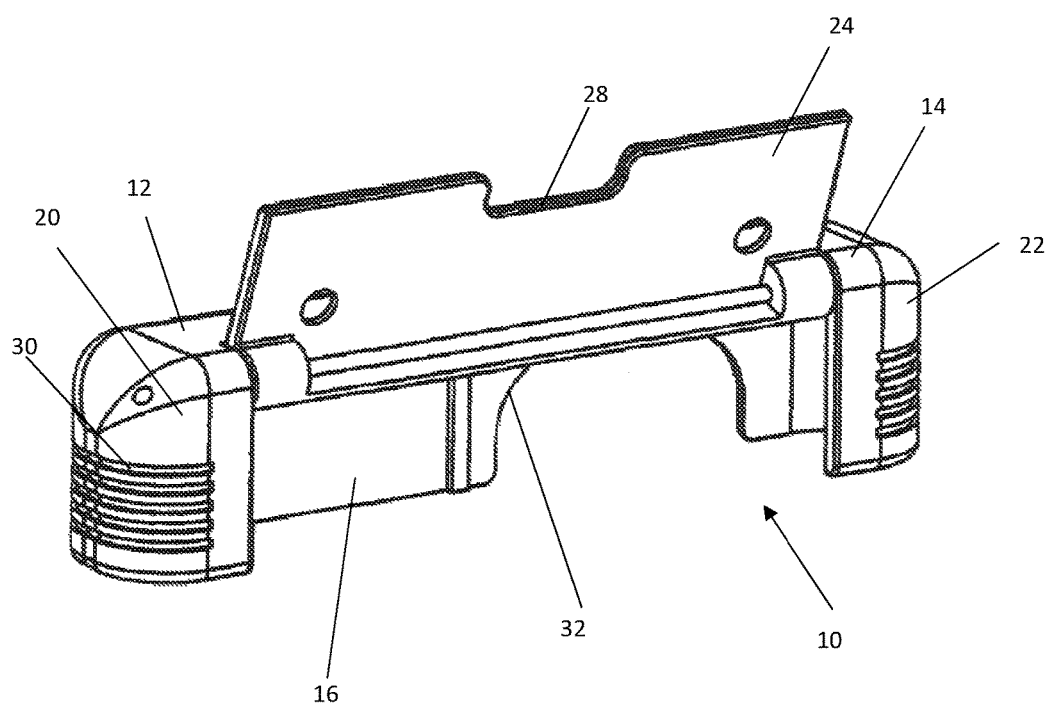
FIG. 2 illustrates a front perspective view of a cover device with a camera cover device in an open position in accordance with embodiments of the invention.

FIG. 2 illustrates the camera cover device 24 in the open position. The camera cover device 24 may be moveable between the open or closed positions through the use of a hinge or by other means. When hinged, the camera cover device 24 can simply be flipped up by the user to expose the camera of the electronic device. Alternative methods of moving the camera cover device between the open and closed positions could also be used such as a sliding window to selectively cover or uncover the camera of the electronic device.

The camera cover device 24 may be configured with an indented opening portion 28. The indented opening portion 28 may be configured to expose a microphone or other elements of the electronic device while the camera cover device 24 is in the closed position, as further explained below in correspondence with FIGS. 7 and 8.

Figure 4:
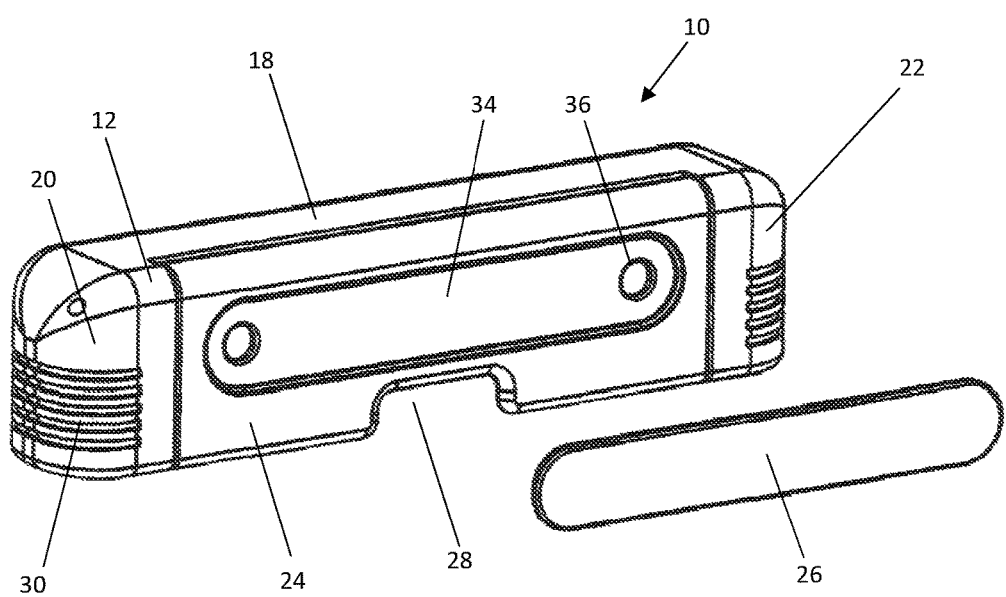
FIG. 4 illustrates a front perspective view of a cover device with a removeable portion removed from the cover device in accordance with embodiments of the invention.

The camera cover device 24 may include a removeable portion 26 configured to be selectively removed from the camera cover device 24. FIG. 1 illustrates the removeable portion 26 attached to the camera cover device 24. FIG. 4 illustrates the removeable portion 26 removed from the camera cover device 24. The camera cover device 24 may have a recessed portion 34 configured to receive the removeable portion such that when the removeable portion is inserted into the recessed portion 34, an outer surface of the removeable portion 26 is flush or substantially flush with an outer surface of the camera cover device 24. The removeable portion 26 and/or the camera cover device 24 may be configured to selectively secure the removeable portion 26 to the camera cover device 24. For example, FIG. 4 illustrates the camera cover device 24 with holes 36 that may be sized to receive prongs or other connector elements on a back side of the removeable portion 26. Alternatively, other means of selectively connecting the removeable portion 26 to the camera cover device 24 may be provided, such as a Velcro attachment, surfaces with sufficient stickiness to secure the elements together, or other know securing methods.

The side portions 20, 22 of the cover device 10 may include grip portions 30 to provide extra grip when taking the cover device 10 on or off of the electronic device 10. The grip portions may be formed from ridges or indentations in the surface of the side portions, for example.

Figure 3:
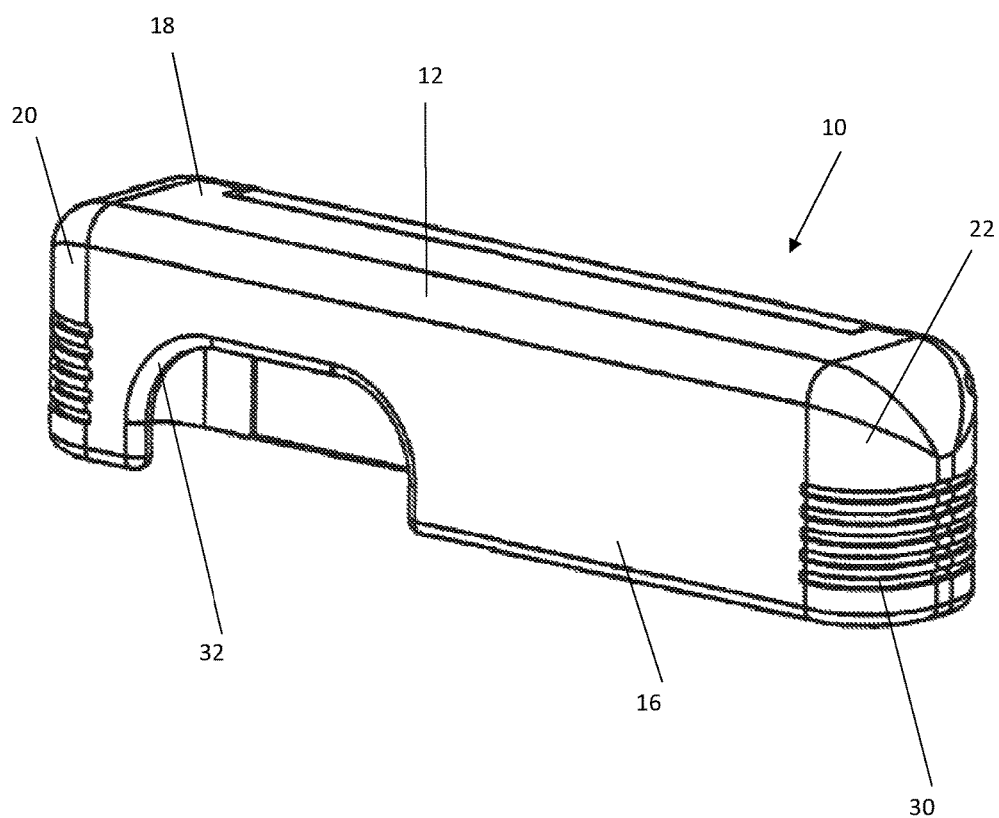
FIG. 3 illustrates a rear perspective view of a cover device in accordance with embodiments of the invention.
Figure 9:
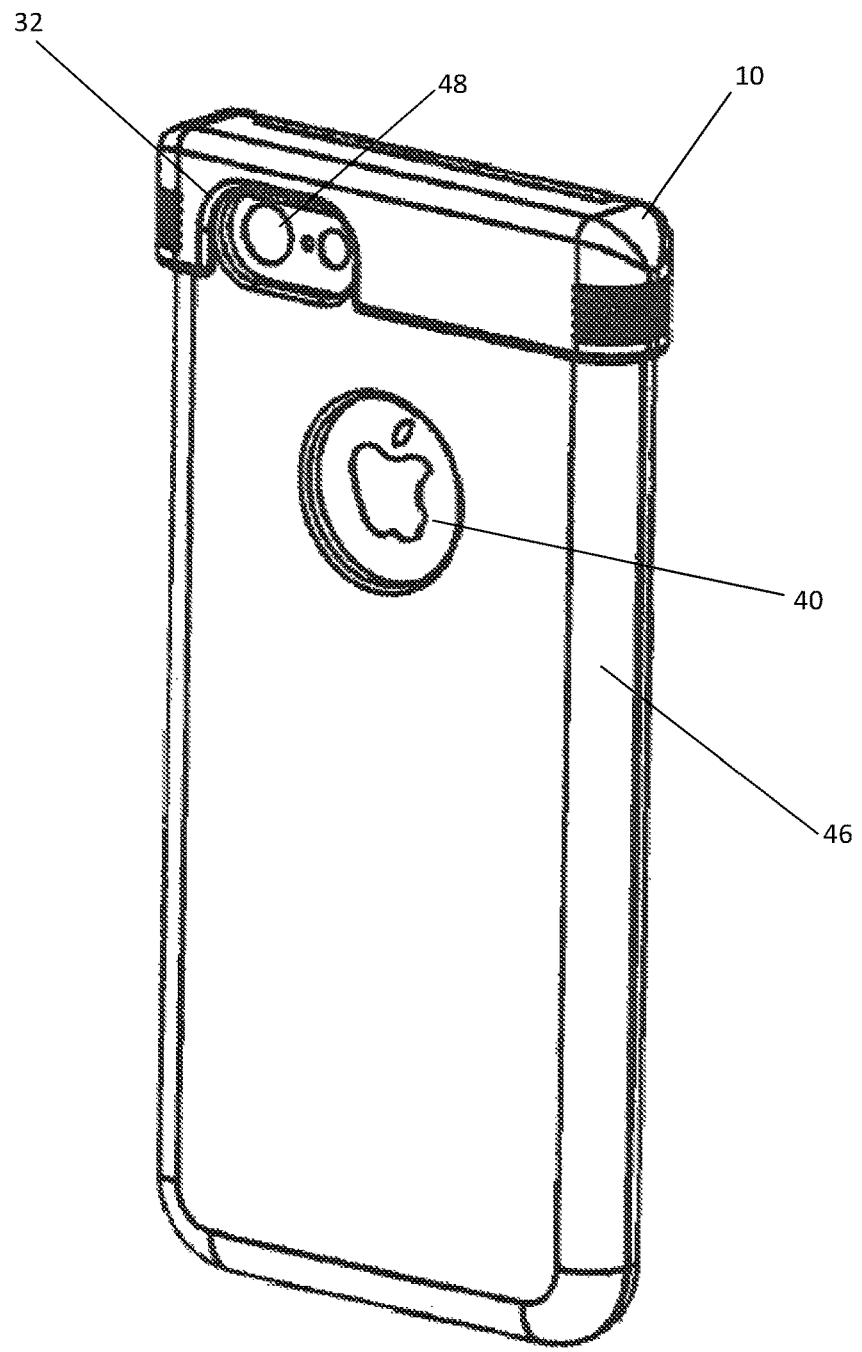
FIG. 9 illustrates a rear perspective view of a cover device mounted on an electronic device in accordance with embodiments of the invention.

FIG. 3 illustrates a back view of the cover device 10. A back wall opening 32 may be formed on the back wall 16 of the cover device 10. The back wall opening 32 may be sized and positioned to expose various elements (such as a back camera or other elements) of the electronic device when the electronic device is inserted into the cover device. For example, FIG. 9 illustrates an electronic device 40, which may be a smartphone, inserted into the opening of the cover device 10, with back wall opening 32 configured to expose back camera 48.

Figure 5:
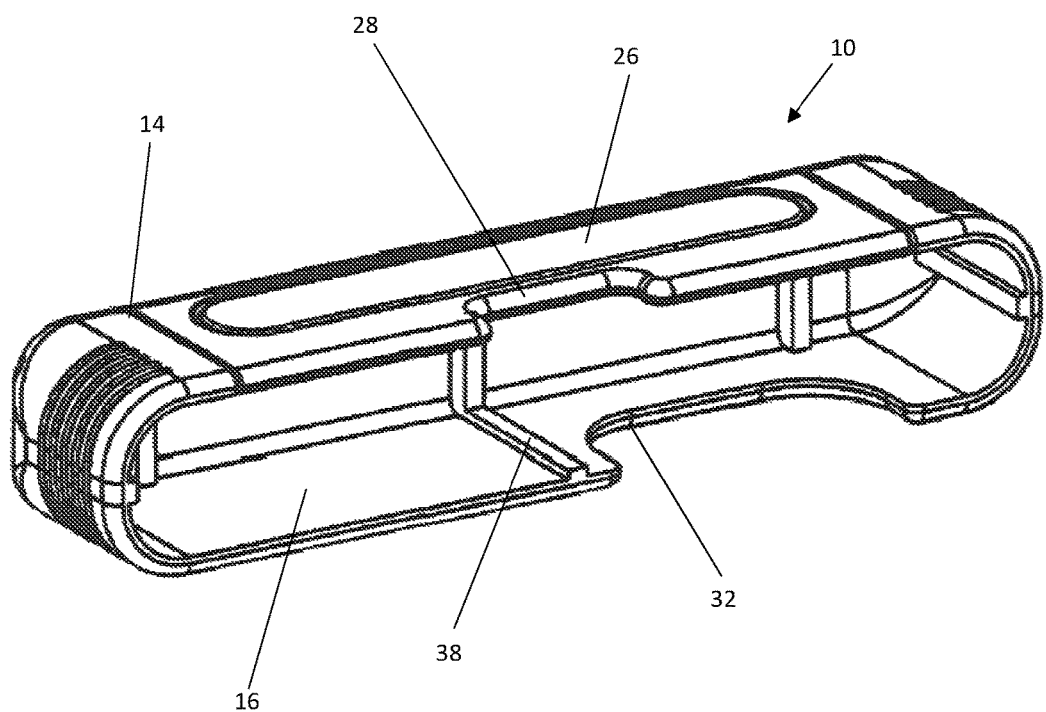
FIG. 5 illustrates a bottom perspective view of a cover device with in accordance with embodiments of the invention.

FIG. 5 illustrates a bottom view of the cover device 10 with opening 16 of the cover device. The opening 16 may be sized to snugly fit a particular model of electronic device, so that the cover device 10 will not easily come off the electronic device. As shown in FIG. 5, an inner surface of the front and back walls 14, 16, the top wall 18 and the side portions 20, 22 may include ribs 38 (projections) which may assist in providing a snug fit between the cover device 10 and the electronic device 40. The ribs 38 may be formed from a relatively hard material such as plastic or from a softer material that has some give, which may assist in fitting the electronic device 40 into the opening of the cover device 10 while providing a snug fit.

Figure 6:
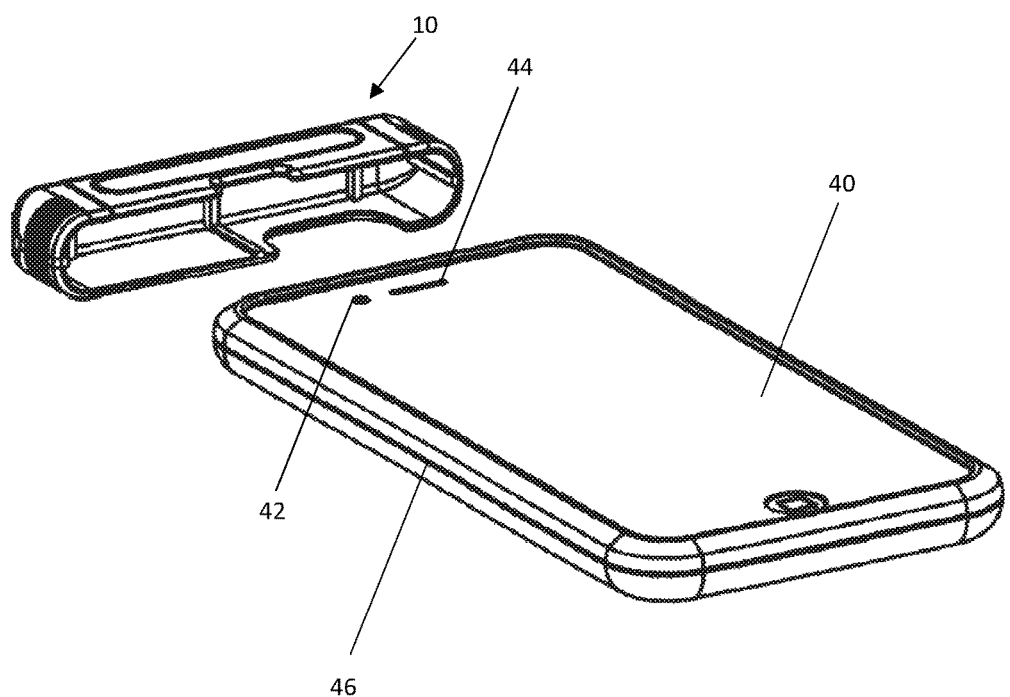
FIG. 6 illustrates a perspective view of a cover device and an electronic device in accordance with embodiments of the invention.

FIG. 6 illustrates an electronic device 40 positioned to be inserted into the opening 16 of the cover device 10. In this example, the electronic device is a phone, but other electronic devices may be used in conjunction with the cover device 10. For example, the electronic device could be a tablet or other personal electronic device (PED), a laptop computer, a display device or television, or any other electronic device that includes a front display and a front facing camera.

The electronic device 40 may have a case or cover, such as electronic device cover 46 illustrated in FIGS. 6-9. Such covers are in common use today, particularly on devices such as smartphones and other PEDs. Accordingly, embodiments of the invention can provide a cover device 10 that is configured to fit snugly over an electronic device 40 that either has such a cover or case or does not have such a cover or case. The cover device 10 can be adapted to cover electronic device covers of any size or dimensions by having a different sized opening 16 of the cover device 10. Also, in some embodiments, the cover device 10 could be formed with just the front and back walls and without the side portions, which could be particularly useful when used on an electronic device with a very wide screen, such as a wide screen television or a computer monitor. In this manner, the cover device 10 would not have to be as wide as the electronic device, which would allow its size to remain advantageously smaller.

Figure 7:
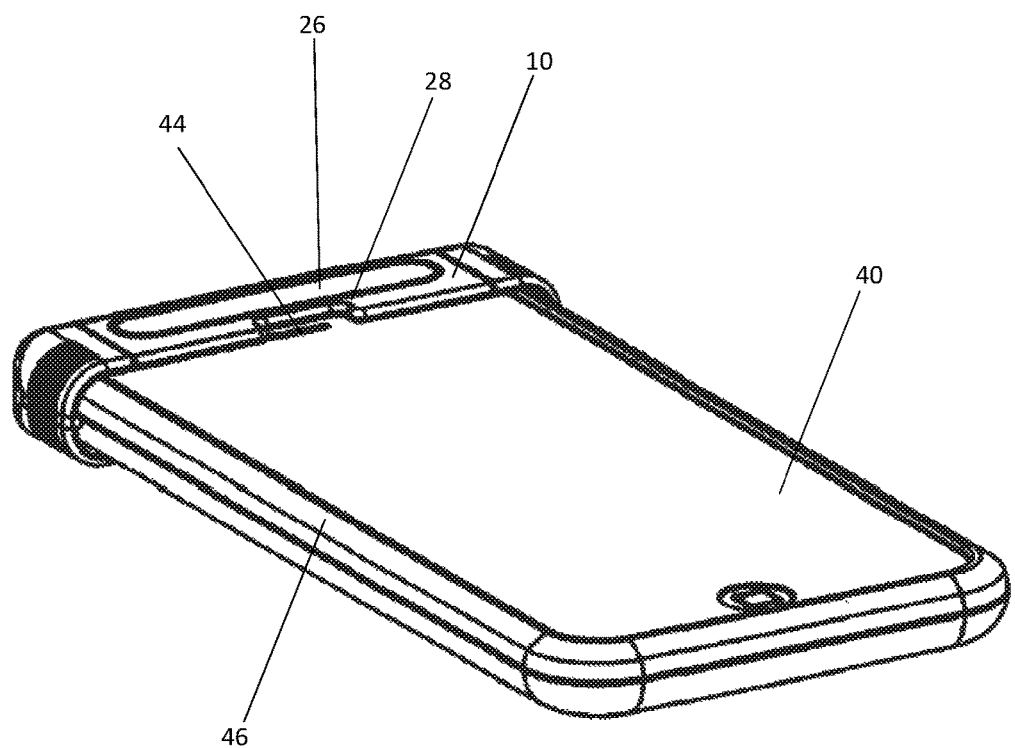
FIG. 7 illustrates a perspective view of a cover device mounted on an electronic device in accordance with embodiments of the invention.
Figure 8:
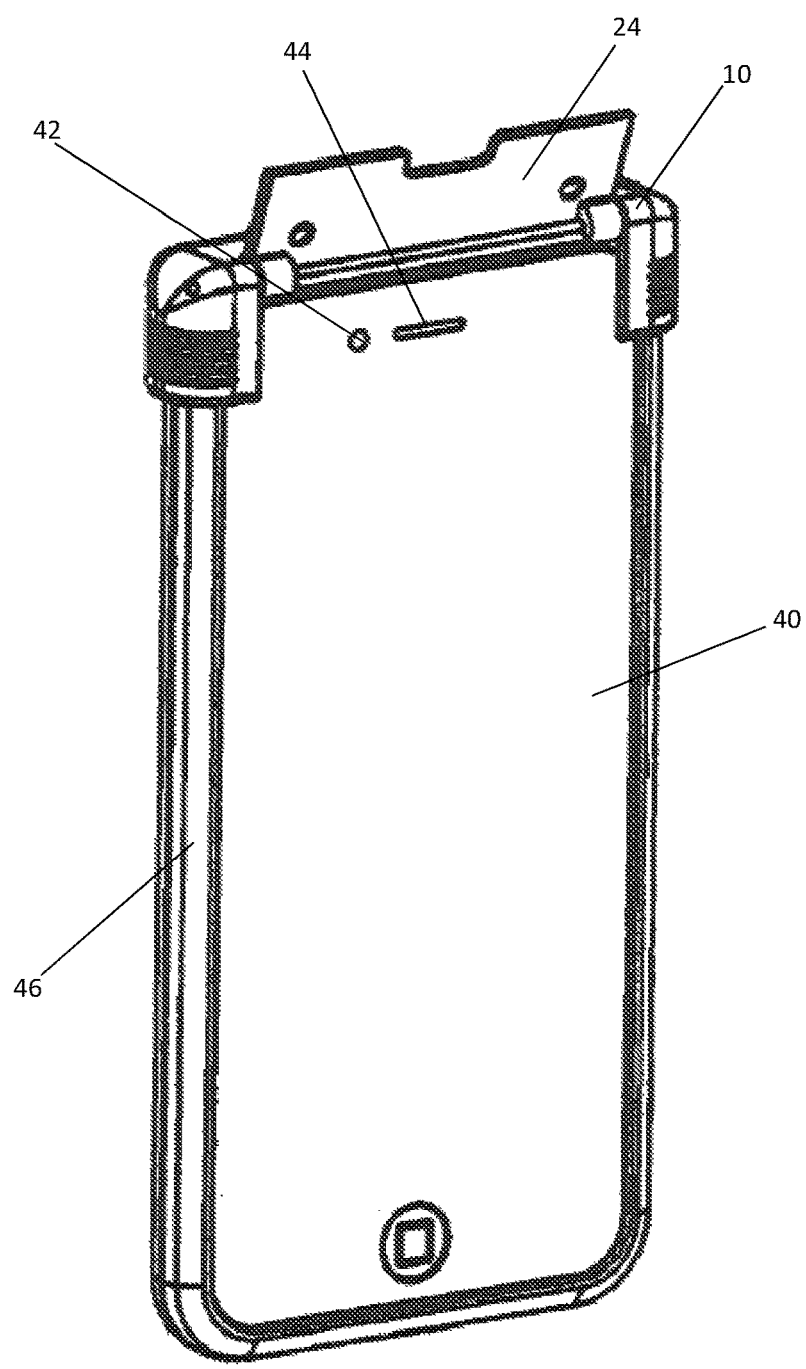
FIG. 8 illustrates a front perspective view of a cover device with a camera cover device in an open position in accordance with embodiments of the invention.

FIGS. 7 and 8 illustrate front views of the cover device 10 installed on an electronic device 40 having an electronic device 46. The indented opening portion 28 is configured to expose the microphone 44 of the electronic device 40 when the electronic device 40 is inserted into the cover device 10 and the camera cover device 24 is in a closed position. The position of the indented opening portion 28 can be varied to expose the microphone depending on the position of the microphone 44 on any particular electronic device while also being configured to cover the camera when the camera cover device is in the closed position. A user can have security and privacy concerning the front camera of the electronic device by use of the cover device by simply placing the camera cover device 24 in the closed position. The user can then easily access the front camera by simply moving the camera cover device to the open position as illustrated in FIG. 8. The size of the indented opening portion 28 may be varied depending on the elements to be exposed and the size of the electronic device.

The removeable portion 26 is illustrated in further detail in FIG. 10. The removeable portion may include a design element 50. The design element 50 may be in the form of text or a graphic design. For example, the design element may be an inspirational phrase or word(s), such as the illustrated "BE STRONG AND COURAGEOUS", a logo or team name, a family name, a school or church name, religious words or phrases, a business or company name, etc.

Embodiments of the present invention overcome problems typically present in electronic devices having front facing cameras, such as phones, tablets, etc. of a lack of privacy and control of the front facing camera by providing the cover device having the camera cover device that can be used to selectively cover or uncover the front facing camera. Additionally, a user is able to provide a customized look to their electronic device by using the removeable portion of the camera cover device with the design element. The user can install a removeable portion having a design element having words or phrases of or a graphic design of the user's choosing, enabling the user to customize the look and feel of their electronic device. For example, the user could acquire a plurality of removeable portions each having a different design element, and the user could install different ones of the removeable portions one different days.

It will be understood that the above described arrangements of apparatus and the methods are merely illustrative of applications of the principles of embodiments of the invention and many other embodiments and modifications may be made without departing from the spirit and scope of the invention as defined in the claims.

What is claimed is:

1. A cover device for selectively covering a camera of an electronic device to prevent unauthorized use of the camera, comprising:
   a housing having an opening to receive an edge portion of the electronic device therein, the opening of the housing defined by a front wall, a back wall positioned opposite the front wall, a first side portion connecting the front wall to the back wall, a second side portion connecting the front wall to the back wall, and a top wall connected to the first and second side portions and to the front and back walls, an front wall opening positioned to expose the camera of the electronic device when the electronic device is inserted into the opening of the cover device; and
   a camera cover device positioned on the front wall of the housing, the camera cover device configured to be selectively moveable to a closed position in which the camera cover device covers the camera of the electronic device and to an open position in which the cover device does not cover the camera of the electronic device when the electronic device is inserted into the opening of the cover device,
   the camera cover device including a removeable portion, the removeable portion having a front portion with a design element disposed thereon so that the design element is visible to a user when the removeable portion is disposed on the camera cover device,
   wherein a user of the camera cover device can utilize removeable portions with different design elements to present a different look to the cover device.

2. The cover device of claim 1, further comprising an indented opening portion in a bottom portion of a front of the camera cover device, the indented opening portion configured to expose a microphone of the electronic device when the electronic device is inserted into the opening of the housing and the camera cover device is in the closed position.

3. The cover device of claim 1, wherein the opening of the housing is sized so that the electronic device will fit snugly within the opening of the housing.

4. The cover device of claim 1, wherein the opening of the housing is sized so that the electronic device with an electronic device case on the electronic device will fit snugly within the opening of the housing.

5. The cover device of claim 1, wherein the electronic device has a front facing camera and is one of a cell phone, a tablet, a display device, a television, or a personal electronic device (PED).

6. The cover device of claim 1, further comprising a back wall opening formed in the back wall of the housing, the back wall opening configured to expose a back camera of the electronic device when the electronic device is positioned within the opening of the housing.

7. The cover device of claim 1, further comprising a recessed portion disposed in a front surface of the camera cover device, the recessed portion being configured to receive the removeable portion therein so that a front surface of the removeable portion is flush with a front surface of the front wall of the housing.

8. The cover device of claim 7, further comprising a connector on at least one of the removeable portion and the recessed portion to selectively connect the removeable portion to the recessed portion of the camera cover device.

9. The cover device of claim 1, further comprising a plurality of spaced ribs disposed on an inner surface of at least one of the front wall, the back wall and the side portions of the housing, the spaced ribs configured to make the electronic device fit snugly within the cover device.

10. The cover device of claim 1, wherein the design element is at least one of a textual phrase or a graphical design.

11. The cover device of claim 1, further comprising grip portions on at least one of the first and second side portions of the housing.

12. A cover device for selectively covering a camera of an electronic device to prevent unauthorized use of the camera, comprising:
   a housing having an opening to receive an edge portion of the electronic device therein; and
   a camera cover device positioned on a front wall of the housing, the camera cover device configured to be selectively moveable to a closed position in which the camera cover device covers the camera of the electronic device and to an open position in which the camera cover device does not cover the camera of the electronic device when the electronic device is inserted into the opening of the cover device,
   the camera cover device including a removeable portion disposed within a recessed portion of the front surface of the camera cover device so that a front face of the removeable portion is flush with a front face of the camera cover device, the removeable portion having a front portion with a design element disposed thereon so that the design element is visible to a user when the removeable portion is disposed on the camera cover device,
   wherein a user of the camera cover device can utilize removeable portions with different design elements to present a different look to the cover device.

13. The cover device of claim 12, further comprising an indented opening portion in a bottom portion of a front of the camera cover device, the indented opening portion configured to expose a microphone of the electronic device when the electronic device is inserted into the opening of the housing and the camera cover device is in the closed position.

14. The cover device of claim 12, wherein the opening of the housing is sized so that the electronic device will fit snugly within the opening of the housing.

15. The cover device of claim 12, wherein the opening of the housing is sized so that the electronic device with an electronic device case on the electronic device will fit snugly within the opening of the housing.

16. The cover device of claim 12, wherein the electronic device has a front facing camera and is one of a cell phone, a tablet, a display device, a television, or a personal electronic device (PED).

17. The cover device of claim 12, further comprising a back wall opening formed in the back wall of the housing, the back wall opening configured to expose a back camera of the electronic device when the electronic device is positioned within the opening of the housing.

18. The cover device of claim 12, wherein the design element is at least one of a textual phrase or a graphical design.

19. The cover device of claim 12, further comprising a plurality of spaced ribs disposed on an inner surface of the housing, the spaced ribs configured to make the electronic device fit snugly within the cover device.

* * * * *